NOBLE, COY & ANGELL.
Smut Machine.
No. 24,140.
Patented May 24, 1859.
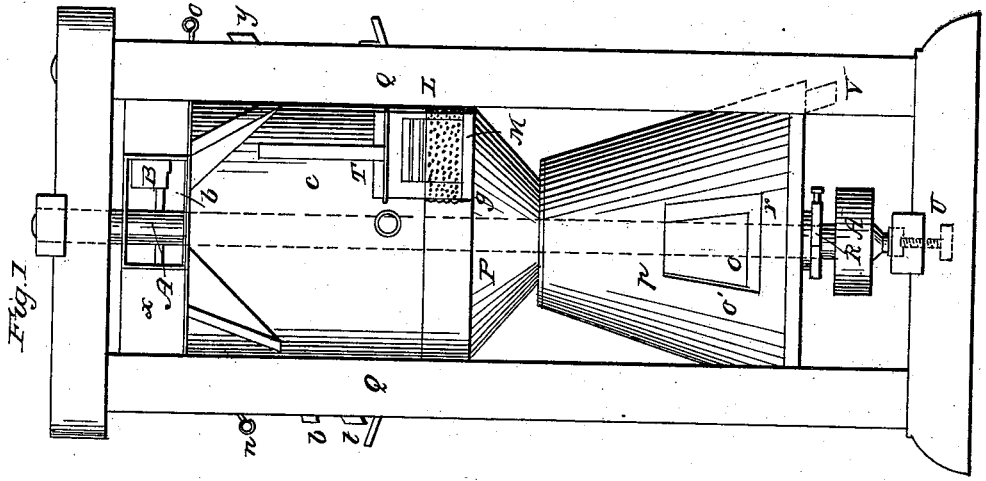
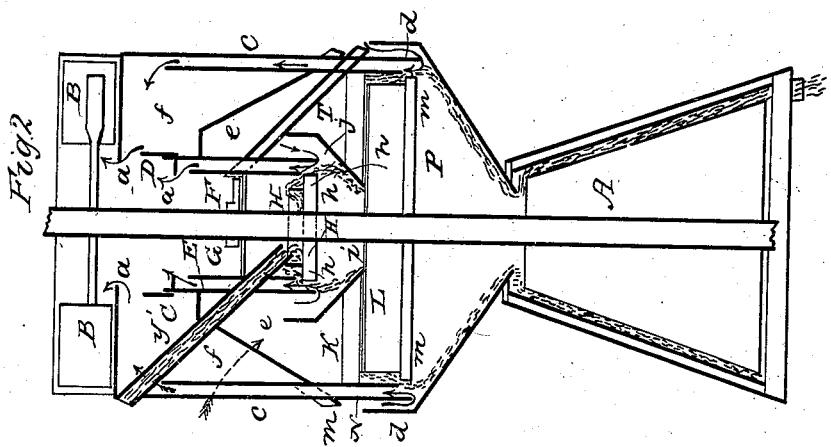
WITNESSES
INVENTOR

UNITED STATES PATENT OFFICE.

T. A. NOBLE AND E. COY, OF AKRON, OHIO, AND J. B. ANGELL, OF ALLEGHENY, PENNSYLVANIA.

SMUT-MACHINE.

Specification of Letters Patent No. 24,140, dated May 28, 1859.

*To all whom it may concern:*

Be it known that we, T. A. NOBLE and ERASTUS COY, of Akron, in the county of Summit and State of Ohio, and JAMES B. ANGELL, of Allegheny city, in the county of Allegheny and State of Pennsylvania, have invented a new and Improved Wheat Huller and Separator; and we do hereby declare that the following is a full and exact description thereof, reference being had to the accompanying drawings and to the letters of reference marked thereon.

In the accompanying drawings, Figure 1 is a front view of our machine. Fig. 2 is a sketch, or sort of section, showing the operation of the huller.

Our machine is designed to remove the cuticle from wheat by a scouring process, and at the same time to separate the bran from the cleaned kernels; and our invention consists in certain improvements in wheat hullers, to facilitate the feeding, scouring and separation of the wheat at a single operation.

The huller may have any suitable frame 2, supporting a vertical shaft A, which is driven by a band upon the pulley T, or by other proper means. The upper part of this shaft A carries a set of fans B, inclosed in a box which has an opening below the fans and around the shaft, and also an opening at one side, as seen at $b$, Fig. 1, where the box is somewhat elongated so as to facilitate the action of the fans. When the shaft A is set in motion and the fans B, revolve a strong current of air is drawn up through the mill, and enters the box X, through its lower opening as indicated by the arrows at $a$, Fig. 2. This current is driven out of the box at the side opening at $b$, Fig. 1. The action of the fans also cause currents of air through various passages of that part of the huller next below box B, and inclosed in case X, Fig. 1. The directions of these currents are indicated by the various arrows seen in Fig. 2. The air chiefly enters case $c$, at arrow marked $d$, but there are also several passages, W, Fig. 1, through which air can pass to space $e$, as shown by arrow, in dotted lines, Fig. 2.

The wheat is fed into the machine by spout Y, so as to fill the cylindrical chamber H, which revolves with the shaft A. The disk forming the bottom of this chamber projects beyond the sides $h$, of said chamber, forming a sort of rim, $h'$. By the revolution of the chamber, the centrifugal action forces the grain over the sides of the chamber upon the rim $h'$ of the said chamber, from which the wheat is thus fed evenly and thinly to meet the blast rising through space E, which completely surrounds the revolving chamber H, and comes in contact with the disk forming the bottom of said chamber. The course of the wheat through the machine is indicated by irregular dots, as in tube Y. Screenings, dust, or other light substances blown from the wheat in space E, fall chiefly in chamber G, which is stationary. The arm F, revolves with shaft A, and constantly sweeps the screenings into the discharge spouts L.

As the wheat descends from hopper J, it falls upon the scouring disk L, which revolves with shaft A. The upper surface of disk L is covered with leather or some other flexible substance, as a rubbing surface ($i$, Fig. 2) and its circumference is armed with a roughened ring of perforated sheet iron, as seen at L, Fig. 1, where a sliding door T, in case $c$, is open to show the parts within. This roughened surface of disk L, is opposed by a corresponding ring $g$, of perforated sheet metal; and above disk L, is an opposing stationary scouring plate K, armed on its under side with a perforated plate of sheet metal. By the revolution of disk L, the centrifugal force drives the wheat between said disk and plate K, as between two mill stones, but the space between these two scouring surfaces being properly adjusted, the kernels are rubbed so as to remove the hull or cuticle without breaking the body of the kernels. The leather surface, being elastic, presses the kernels upon the rough perforations of the metallic surface and removes mostly the outer skin or cuticle, and then as the kernels fall over the margin of the disk L, they are subjected to the action of two metallic graters. By these actions, the cuticle is almost entirely removed from the wheat kernels, which fall from the flange M, of disk L, into hopper P. A very strong blast of air meets the wheat as it falls from cylinder L, carrying the bran through space N, while the wheat falls into hopper P. As the passage N, terminates in the increased air chamber $f$ the air current in passage N, is broken and diffused in said chamber $f$, so as to allow most of the bran to fall in said chamber, to be discharged at spout m. The force of the blast through space N, is regulated by the hoop or ring C, which is adjustable by wire n, or by other means. The force of the blast through space E is regulated by a flat ring D, adjustable by wire o, or other suitable device. As the wheat descends from hopper P, which has the form of an inverted and truncated hollow cone, it is fed evenly at all sides of the conical scourer O, into the space surrounding said cylinder. This scourer O, revolves with shaft A, and is covered with leather, or other elastic material, as seen at O, Fig. 1, where the sliding door p, in case O', is represented as open to show the parts within. This leather surface of scourer O, is opposed by a stationary plate r, made of perforated sheet metal, so that the wheat is here again subjected to a rubbing or polishing action between an elastic surface and a grating one, thus completing the cleaning process. The small particles thus removed pass through the perforated plate around scourer O, and thus escape from the mill separately from the wheat. The scourer O is adjustable upon shaft A, by means of a screw nut R, provided with a set screw s; and the disk L, in connection with the shaft A, may be raised or lowered at pleasure, by means of adjusting screw U.

We are aware that various devices have been employed for regulating the draft through mills. We also know that scrapers, feed distributers and adjusting screws are not new, and that elastic substances have been used to cover rollers in hulling machines. Therefore we confine all our claims to the peculiar arrangements in our machine, which we believe are substantial improvements in mills for hulling and grinding wheat in the same operation.

Having thus fully described our invention, what we claim and desire to secure by Letters Patent of the United States is:

1. The adjustable hoop C in connection with the increased air chamber f, to regulate the blast passing up through the circular opening N, also the adjustable ring D, to regulate the blast coming up through the circular opening E, the operation in both cases being to increase or diminish the blast as may be required, substantially as set forth.

2. The chamber G, in combination with arm F, and spout Z, when said chamber is placed above the revolving chamber H, to catch the screenings, substantially as set forth.

3. The revolving chamber H, provided with sides h, and rim h', for distributing the wheat evenly as it falls over the edge of the rim, h', so as to be more effectually operated upon by the blast passing up the opening E; and also the flange M, upon cylinder L, for the similar distribution of the wheat to the second blast rising through opening N, as set forth.

4. Making the conical scourer O adjustable perpendicularly both independently of shaft A and disk L and in connection with said shaft and disk substantially as set forth.

T. A. NOBLE.
ERASTUS COY.
JAMES B. ANGELL.

Witnesses:
H. A. NOBLE,
WM. L. CLARKE.